US005259192A

United States Patent [19]

Karakama et al.

[11] Patent Number: 5,259,192

[45] Date of Patent: Nov. 9, 1993

[54] HYDRAULIC CIRCUIT SYSTEM

[75] Inventors: Tadao Karakama; Teruo Akiyama, both of Kanagawa, Japan

[73] Assignee: Kabushiki Kaisha Komatsu Seisakusho, Japan

[21] Appl. No.: 910,340

[22] PCT Filed: Nov. 29, 1991

[86] PCT No.: PCT/JP91/01673

§ 371 Date: Jul. 22, 1992

§ 102(e) Date: Jul. 22, 1992

[87] PCT Pub. No.: WO92/09810

PCT Pub. Date: Jun. 11, 1992

[30] Foreign Application Priority Data

Nov. 30, 1990 [JP] Japan .................................. 2-341145

[51] Int. Cl.[5] .............................................. F16D 31/02

[52] U.S. Cl. ........................................ 60/422; 60/426; 60/468; 91/518; 91/445; 91/447

[58] Field of Search ................. 60/422, 426, 468, 494; 91/31, 445, 446, 447, 448, 514, 517, 518, 532

[56] References Cited

U.S. PATENT DOCUMENTS 5,188,147 2/1993 Shiria et al. ........................... 91/446

FOREIGN PATENT DOCUMENTS 2906670 9/1980 Fed. Rep. of Germany ........ 91/447

57-116962 7/1982 Japan .

*Primary Examiner*—Edward K. Look

*Assistant Examiner*—F. Daniel Lopez

*Attorney, Agent, or Firm*—Ronald P. Kananen

[57] ABSTRACT

This invention provides a hydraulic circuit system capable of reducing the flow rate distribution error in supplying pressurized fluid from a single hydraulic pump into a plurality of hydraulic actuators, and also supplying pressurized fluid quickly. The circuit is simplified to reduce manufacturing costs. This system comprises a plurality of operating valves (15) provided in circuits (10*a*, 17) connected between a hydraulic pump (10) and a plurality of hydraulic actuators (16); a plurality of pressure compensating valves (18) which can be set at a highest value load pressures applied to the hydraulic actuators, respectively; and a load pressure detection port (37) provided in each operating valve so as to detect an intermediate value between the inlet and outlet pressures of each pressure compensating valves (18) from within the operating valves when each operating valve (15) is held at fluid supply position (I or II), the load pressure detection port being connected through a check valve (42) with a load pressure introduction conduit (23), wherein each pressure compensating valve (18) has a first pressure receiving portion (19) adapted to urge it by fluid pressure applied thereto in a direction to disconnect it and which is connected with the load pressure introduction conduit (23); and a second pressure receiving portion (21) adapted to urge it by fluid pressure applied thereto in a direction to connect it and which is connected with fluid outlet side of the operating valve (15) so that the load pressure can be detected from the fluid inlet side of the pressure compensating valve (18).

8 Claims, 7 Drawing Sheets

THE PRIOR ART

HYDRAULIC CIRCUIT SYSTEM

TECHNICAL FIELD OF THE INVENTION

This invention relates to a hdyraulic circuit system for supplying fluid under pressure discharged by a single hyraulic pump into a plurality of hydraulic actuators, and more particularly to a hydraulic circuit system which can reduce the flow rate distribution error in supplying pressurized fluid into the plurality of hydraulic actuators.

BACKGROUND ART OF THE INVENTION

To supply fluid under pressure discharged by a single hydraulic pump into a plurality of hydraulic actuators, it is only necessary to provide a plurality of operating valves and construct a hydraulic circuit system so as to supply pressurized fluid into each of the hydraulic actuators by switching over the operating valves. In such a circuit system thus constructed, when pressurized fluid is supplied into a plurality of actuators at the same time, pressurized fluid is supplied only into hydraulic actuators with low loading thereon, but not supplied into those with high loading thereon.

As a hydraulic circuit system which overcomes this disadvantage, the system shown, for example, in the publication of Japanese Patent No. HEI 2-49405 has been proposed.

A schematic diagram of such a hydraulic circuit system is shown in FIG. 7.

Stating in brief, a hydraulic pump 1 has a discharge conduit 1*a* which is provided with a plurality of operating valves 2, and pressure compensating valves 5 are provided in circuits 4 connecting the operating valves 2 with hydraulic actuators 3, respectively. The arrangement is made such that when the operating valves 2 are operated at the same time the hydraulic actuators 3 can be supplied with pressurized fluid at a flow-rate distribution ratio proportional to the ratio in the area of openings of operating valves 2 by detecting the pressure in each of the circuits 4, that is, a highest value of the load pressures by means of check valves 6, and applying the detected pressure to each of pressure compensating valves 5 to set it at a pressure corresponding to the load pressure, thereby equalizing the pressures on the outlet sides of the operating valves 2.

In such a hydraulic circuit system, a flow rate distribution of pressurized fluid proportional to ratio in the area of openings of the operating valves 2 is obtained by the functions of the pressure compensating valves 5 irrespective of the magnitude of loading on each hydraulic actuator 3 so that the pressurized fluid discharged by the single hydraulic pump 1 can be supplied into the hydraulic actuators 3 at a flow-rate distribution ratio proportional to the ratio in the manipulated variables of the operating valves 2.

However, since the load pressures on the hdyraulic actuators 3 are detected and compared on the outlet sides of the pressure compensating valves 5, and then a highest pressure of the load pressure is introduced into pressure receiving portions 5*a* which serve to increase the setting pressure of the pressure compensating valves 5, the detected pressure Pa is lower than the inlet pressure $P_6$ by a value corresponding to the pressure loss of fluid passing through each pressure compensating valve 5. As a result, the flow rates of pressurized fluid passing through the pressure compensating valves 5 are accompanied by an error corresponding to the pressure loss, thereby causing a flow rate distribution error.

Stating in brief, the flow rate $Q_1$ of pressurized fluid passing through the pressure compensating valve 5 with a low load pressure thereon and the flow rate $Q_2$ of pressurized fluid passing through the pressure compensating valve 5 with a high load pressure thereon can be expressed by the following equations.

$$Q_1 = ca_1\sqrt{Pc - Pb + (Pb - Pa)}$$

$$Q_2 = ca_2\sqrt{Pc - Pb}$$

Wherein C is a constant, $a_1$ and $a_2$ are the areas of openings of operating valves, and Pc is the discharge pressure.

Therefore, an error corresponding to the pressure loss (Pb−Pa) through each pressure compensating valve 5 occurs in the respective flow rates.

Further, the above-mentioned problem can be solved by detecting the load pressures on the inlet sides of the pressure compensating valves 5, however, because the same pressure Pb acts on the pressure receiving portion on which a high setting pressure is applied and that on which a low setting pressure is applied, the pressure compensating valves 5 are closed by the respective springs 7 so that no pressurized fluid is supplied into the hdyraulic actuators 3.

Further, when the operating valves 2 are located at their neutral positions, the holding pressure for each hydraulic actuator 3 is supplied through the check valve 6 into a displacement control unit 8 of the hydraulic pump 1 so that the displacement of the hydraulic pump 1 is increased to raise the discharge pressure of the hydraulic pump 1 so as to correspond to the holding pressure, thereby wasting the drive horsepower developed by the hydraulic pump 1. To cope with this, if the circuit for introducing the load pressure into the displacement control unit 8 is connected through a restrictor 9 with the fluid tank so as not to increase the displacement of the hydraulic pump 1, then the holding pressure is released through the restrictor 9 to the fluid tank, thereby causing a very large spontaneous lowering of the hydraulic actuators to render it impossible to hold the latter. To eliminate this defect, the prior art hydraulic circuit is provided with a counter-balancing valve to prevent the holding pressure for each of the hydraulic actuators 3 from being led to each of the check valves 6, thus complicating the circuit arrangement and increasing the number of component parts, which results in a significant cost reduction.

SUMMARY OF THE INVENTION

The present invention has been made in view of the above-mentioned circumstances, and has for its object to provide a hydraulic circuit system capable of reducing the flow rate distribution error in supplying pressurized fluid from a single hydraulic pump into a plurality of hydraulic actuators, and also supplying pressurized quickly.

Another object of the present invention is to provide a hydraulic circuit system whose circuit arrangement is simplified to enable the system to be manufactured at a low cost.

To achieve the above-mentioned objects, according to the main aspect of the present invention, there is provided a hydraulic circuit system including: a plurality of operating valves provided in a discharge conduit of a hydraulic pump; and a plurality of pressure compensating valves provided in a plurality of connection circuits connected between these operating valves and a plurality of hydraulic actuators, wherein these pressure compensating valves are set at a highest value of the load pressures applied to the hydraulic actuators, respectively, characterized in that each pressure compensating valve is held to be biased by the resilient force of a spring in such a direction as to disconnect it, and that each of the pressure compensating valves has a second pressure receiving portion adapted to urge it by the fluid pressure applied thereto in such a direction as to connect it, and a first pressure receiving portion adapted to urge it by the fluid pressure applied thereto in combination with the resilient force of the spring in such a direction as to disconnect it, the second pressure receiving portion being connected with the pressurized fluid outlet side of each operating valve, and the first pressure receiving portion being connected with a load pressure introduction conduit which is connected through a check valve with a load pressure detection port of each operating valve, and that on the pressurized fluid outlet side of each pressure compensating valve each of the connection circuits is connected through a hypass conduit with the operating valve associated therewith, and that when each of the operating valves is located at its neutral position the load pressure detection port is connected with the fluid tank, and also pumping ports, actuator ports and outlet ports of the operating valve are disconnected, the outlet ports being connected with the bypass conduits, respectively, whilst when each of said operating valves is located at a position for supplying pressurized fluid into the hydraulic actuator associated therewith one of the pumping ports of the operating valve is connected through a first passage with one of the actuator ports, and also one of the outlet ports connected with the bypass conduits, respectively, is connected with the first passage through a second passage having a first restrictor, a load check valve and a second restrictor, and at the same time the second passage is connected through a third passage formed between the first and second restrictors with the load pressure detection port.

In the hydraulic circuit apparatus incorporating the above-mentioned aspect, each operating valve has the load pressure detection port formed therein and adapted to detect an intermediate pressure between the inlet and outlet pressures of each pressure compensating valve from inside thereof when the operating valve is located at its position for supplying pressurized fluid, the load pressure detection port is connected through the check valve with the load pressure introduction conduit, and each pressure compensating valve has the first pressure receiving portion adapted to urge it by the fluid pressure applied thereto in such a direction as to disconnect it and which is connected with the load pressure introduction conduit, and a second pressure receiving portion adapted to urge it by the fluid pressure applied thereto in such a direction as to connect it and which is connected with the pressurized fluid outlet side of the operating valve, and therefore the load pressure can be detected from the inlet side of each pressure compensating valve.

According to the hydraulic circuit system of the present invention, since an intermediate pressure between the inlet and outlet pressures of the pressure compensating valve 18 is supplied to the first pressure receiving portion 19 adapted to urge the pressure compensating valve 18 by the fluid pressure applied thereto in such a direction as to disconnect it, the error in flow rate of fluid passing through the pressure compensating valve 18 due to the pressure loss is reduced, thereby reducing the flow rate distribution error in supplying pressurized fluid into a plurality of hydraulic actuators 16, and also since the fluid pressure supplied to the first pressure receiving portion 19 becomes lower than the outlet pressure of the operating valve 15 supplied to the second pressure receiving portion 21 adapted to urge the pressure compensating valve 18 by the fluid pressure applied thereto in such a direction to connect it, the pressure compensating valve 18 is rendered operative in a direction to connect it so that it may conduct pressure compensating action.

Further, when the operating valve 15 is located at its neutral position, the load pressure direction port 37 is connected with the fluid tank so as to reduce the pressure in the fluid pressure introduction conduit 23 to zero, and the holding pressure for the hydraulic actuator 16 is not applied to the load pressure introduction conduit 23. Therefore, in case the displacement of the hydraulic pump 10 is controlled by utilizing the load pressure in the load pressure introduction conduit 23, there is no possibility of the displacement of the hydraulic pump 10 being increased by the holding pressure, thereby eliminating the need for provision of a counterbalancing valve in the circuit between the outlet side of each of the pressure compensating valves 18 and the hydraulic actuator 16. As a result, not only the hydraulic circuit arrangement can be simplified, but also the number of component parts thereof can be reduced so that the cost of the hydraulic circuit system can be reduced substantially.

Further, because the load pressure is detected from the passages 48 and 49 formed within the operating valve 15, the load pressure detection circuit is simplified.

Yet further, since the load pressure detection port 37 of each operating valve 15 is connected through the check valve 42 with the load pressure introduction circuit 23, when a plurality of operating valves 15 are manipulated at the same time, a highest load pressure is introduced into the load pressure introduction conduit 23 so that the hydraulic actuators 16 can be supplied with pressurized fluid at a proper flow rate distribution ratio.

The above-mentioned and other objects, aspects and advantages of the present invention will become apparent to those skilled in the art by making reference to the following detailed description and the accompanying drawings in which preferred embodiments incorporating the principles of the present invention are shown by way of example only.

DETAILED DESCRIPTION OF PREFERRED EMBODIMENTS

A preferred embodiment and several modifications of the persent invention will now be described in detail below with reference to the accompanying drawings (FIGS. 1 to 6).

Firstly, the first embodiment of the present invention will be described in detial with reference to FIGS. 1 to 3.

Figure 1:
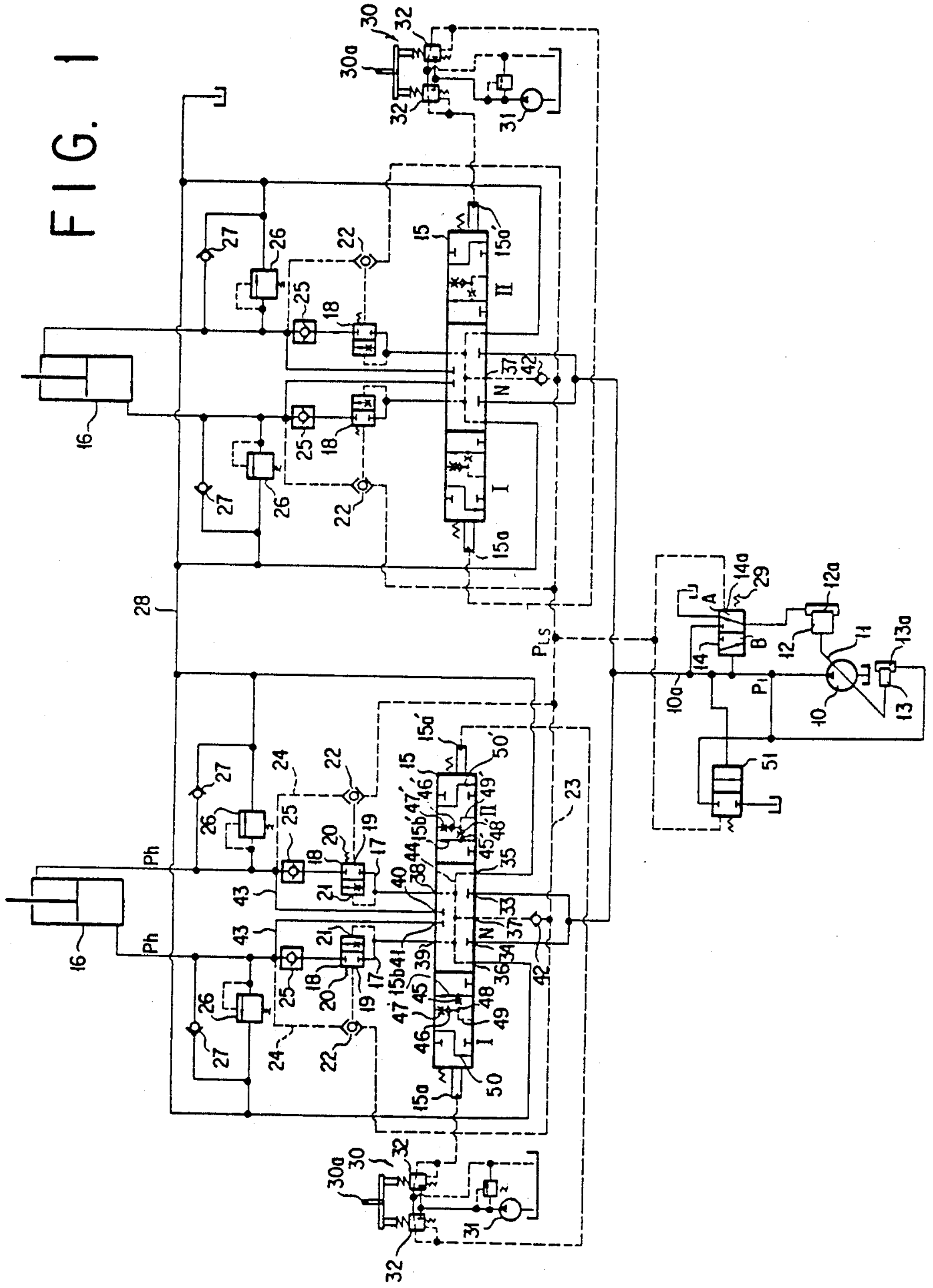
FIG. 1 is a schematic hydraulic circuit diagram showing a first embodiment of the present invention.

As shown in FIG. 1, a hydraulic pump shown therein is of a variable displacement type whose displacement, or the rate of flow of fluid under pressure discharged thereby per one revolution is varied by varying the angle of its swash plate 11, the swash plate being tilted by a large diameter piston 12 in such a direction as to reduce the displacement of the pump, and also tilted by a small piston 13 in the opposite direction to increase the displacement thereof.

The above-mentioned large diameter piston 12 has a pressure chamber 12*a* which is connected or disconnected by a control valve 14 with or from a discharge conduit 10*a* of the hydraulic pump 10, while the small diameter piston 13 has a pressure chamber 13*a* which is connected with the above-mentioned discharge conduit 10*a*.

The discharge conduit 10*a* of the above-mentioned hydraulic pump 10 is provided with a plurality of operating valves 15. Each circuit 17 connecting each of the operating valves 15 with each of hydraulic actuators 16 is provided with a pressure compensating valve 18. The pressure compensating valve 18 is arranged to be urged to its disconnecting position by a pilot fluid under pressure applied to a first pressure chamber and the resilient force of a spring 20 in combination, and also urged to its connecting position by a pilot pressurized fluid applied to its second pressure chamber 21. The second chamber 21 of the pressure compensating valve 18 is connected with the fluid inlet side so that it is supplied with an inlet pressure (that is, the pump discharge pressure), whilst the first pressure chamber 19 is connected through a shuttle valve 22 with a load pressure introduction conduit 23 and a holding pressure introduction conduit 24, respectively, so that it is supplied with a highest load pressure or a highest actuator holding pressure.

The above-mentioned holding pressure introduction conduit 24 is connected with the output side of a load check valve 25 connected with the above-mentioned connection circuit 17. This load check valve 25 is adapted to be opened by the fluid pressure in the outlet of the pressure compensating valve 18.

The portion of the connection cirucit between the load check valve 25 and the hydraulic actuator 16 is connected through a relief valve 26 and a suction valve 27 with a drainage conduit 28.

The above-mentioned control valve 14 is arranged to be urged by a fluid pressure within the discharge conduit 10*a*, that is, the discharge pressure $P_1$ of the pump 10 to a connecting position B, and also urged by the resilient force of a spring 29 and the above-mentioned load pressure $P_{LS}$ to a drainage position A. The control valve 14 is arranged such that when the differential pressure $\Delta P_{LS}$ $(P_1 - P_{LS})$ or the difference between the discharge pressure $P_1$ and the load pressure $P_{LS}$ becomes more than the resilient force of the spring 29 it is urged to its connecting position B where the discharge pressure $P_1$ is supplied into the pressure chamber 12*a* of the large diameter piston 12, thereby tilting the swash plate 11 in such a direction as to reduce the displacement, and when the above-mentioned pressure differential $\Delta P_{LS}$ is less than the resilient force of the spring 29 it is urged to its drainage position A where the fluid under pressure within the pressure chamber 12*a* of the large diameter piston 12 is released into a fluid tank, thereby tilting the swash plate 11 in such a direction as to increase the displacement of the pump.

The above-mentioned operating valve 15 is arranged to be operated in such a direction as to increase the area of opening thereof in proportion to the pressure of the pilot fluid under pressure from a pilot control valve 30, the pressure of the pilot pressurized fluid being proportional to the operational stroke of an operating lever 30*a*.

That is to say; the above-mentioned pilot control valve 30 comprises a plurality of pressure reducing portion 32 adapted to output the pressurized fluid discharged by a fluid pump 31, which supplies pilot fluid under pressure, in proportion to the operational stroke of the lever 30, the outlet side of the pressure reducing portions 32 being connected with a pressure receiving portion 15*a* of each of the operating valves 15. When the operating lever 30 is manipulated so as to output fluid under pressure through one of the pressure reducing units 32, the operating valve 15 is switched from its neutral position over either to a first fluid supply position I or to a second fluid supply position II, the changeover stroke thereof being proportional to the pressure of the pilot pressurized fluid from the pressure reducing portions 32.

Each of the above-mentioned operating valves 15 comprises on the pressurized fluid inlet side a first pumping port 33, a second pumping port 34, a first tank port 35, a second tank port 36, and a load pressure detection port 37, and on the fluid outlet side a first actuator port 38, a second actuator port 39, a first auxiliary port 40, and a second auxiliary port 41, the first and second pumping ports 33, 34 being connected with the discharge conduit 10*a* of the hydraulic pump 10, the first and second tank ports 35, 36 being connected with the above-mentioned drainage conduit 28, the load pressure detection port 37 being connected through a check valve 42 with the above-mentioned load pressure introduction conduit 23, the first and second actuator ports 38, 39 being connected with the fluid inlet sides of the pressure compensating valves 18, and the first and second auxiliary ports 40, 41 each being connected through a bypass conduit 43 with the outlet side of each of the load check valves 25 provided in the connection circuits 17, respectively.

When the above-mentioned operating valve 15 is located at its neutral position N, the first and second tank ports 35, 36, the first and second actuator ports 38, 39, and the load pressure detection port 37 are allowed to communicate through a connection conduit 44 formed within the operating valve 15, and the first and second pumping ports 33, 34 are disconnected from the first and second auxiliary ports 40, 41, respectively. Further, when the operating valve 15 is located at its first pressurized fluid supply position I, the first pumping port 33 is allowed to communicate through a first passage 15*b* formed within the operating valve 15 with the first actuator port 38, and at the same time the first passage 15*b* is allowed to communicate with the first auxiliary port 40 through a second passage 48 formed within the operating valve 15 and which comprises a first restrictor 45, a load check valve 46 and a second restrictor 47, this second passage 48 being connected with the load pressure detection port 37 through a third passage 49 defined between a first restrictor 45 and a load check valve 46 within the operating valve 15, and also the second auxiliary port 41 being connected with the second tank port 36 through a fourth passage 50 which is formed within the operating valve 15. Whilst, when the operating valve 15 is located at its second pressurized fluid supply position II, the second pumping port 34 is allowed to communicate with the second actuator port 39 through a first passage 15*b*′, and at the same time the frist passage 15*b*′ is allowed to communicate with the second auxiliary port 41 through a second passage 48′ formed within the operating valve 48′ and which comprises a first restrictor 45′, a load check valve 46′ and a second restrictor 47′ in the same manner as the afore-mentioned, this second passage 48′ being connected through a third passage 49′ between the first restrictor 45′ and the load check valve 46′ with the load pressure detection port 37, and also the first auxiliary port 40 being connected through a fourth passage 50′ with the first tank port 35.

Stating in brief, the operating valves 15 are of a closed center type.

The discharge conduit 10*a* of the above-mentioned hydraulic pump 10 is provided with an unloading valve 51 which is arranged to unload when the pressure differential $\Delta P_{LS}$ between the discharge pressure $P_1$ and the load pressure $P_{LS}$ exceeds a preset value. The unloading valve 51 is arranged to be opened when the pressure differential $\Delta P_{LS}$ becomes more than the preset value so as to release the fluid discharged by the hydraulic pump 10 into the fluid tank, thereby reducing the peak value of the discharge pressure $P_1$, and also drain the fluid discharged by the hydraulic pump 10 into the fluid tank when each of the operating valves 10 is held at its neutral position.

Next, the oepration of the hydraulic circuit system will be described.

(when the operating valves 15 are held at their neutral positions)

As shown in FIG. 1, the discharge conduit 10*a* of the hydraulic pump 10 is blocked off by the operating valve 15 and the flow of pressurized fluid discharged by the hydraulic pump 10 is shut off, but because the pressure in the load pressure introduction conduit 23 is zero, the angle of the swash plate 11, and hence the amount of fluid discharged by the hydraulic pump 10 are reduced by the control valve 14 so that the pump discharge pressure will become a low value which corresponds to the resilient force of the spring 29. At that time, when the flow of fluid discharged by the hydraulic pump 10 is shut off and becomes surplus, the discharge pressure $P_1$ tends to rise, however, the unloading valve 51 is opened, thereby allowing the fluid discharged by the pump to be released through the unloading valve 51 into the fluid tank.

Then, the second pressure chamber 21 of the pressure conpensating valve 18 is connected through the first and second actuator parts 38, 39, the passage 44, and the first and second tank ports 35, 36 with the drainage conduit 38 so that the pressure compensating valve 18 is held by the resilient force of the spring 20 at its disconnecting position where since the holding pressure Ph of the hydraulic actuator 16 is held by the pressure compensating valve 18, and also by the operating valve 15 through the bypass conduit 43, the spontaneous drop in the pressure within the hydraulic actuator 16 is limited.

Further, in FIG. 1, each of the load check valves 25 serves to prevent the holding pressure from acting on the outlet side of the pressure compensating valve 18 and is opened when the pressure in the outlet of the pressure compensating valve 18 becomes higher than the holding pressure.

(when one of operating valves 15 is held at its first pressurized fluid supply position I) . . . Refer to FIG. 2

Further, since the following description is applicable to the case where the operating valve 15 is held at its second fluid supply position II, the description thereof is omitted herein to avoid duplication of description.

① When the lever 30*a* of the pilot control valve 30 is manipulated to output the pressurized fluid from the pressure reducing portions 32 and supply it into the pressure receiving portion 15*a* of the operating valve 15, the operating valve 15 is switched from the neutral position N over to the first pressurized fluid supply position I.

This allows the fluid under pressure discharged by the hydraulic pump 10 to be supplied from the first pumping port 33 through the first passage 15*b* and via the first actuator port 38 into the inlet of the pressure compensating valve 18, and also supplied into the second pressure receiving portion 21 of the pressure compensating valve 18 at the same time.

Whilst, the fluid under pressure discharged by the hydraulic pump 10 is supplied through the second passage 48 and the third passage 49 and via the load pressure detection port 37 into the load pressure introduction conduit 23.

The fluid pressure in this load pressure introduction conduit 23 is compared by the shuttle valve 22 with the holding pressure in the hydraulic actuator 16, and is applied to the control valve 14 as a pilot fluid pressure.

② When the discharge pressure $P_1$ of the hydraulic pump 10 is lower than the holding pressure Ph in the above-mentioned condition, since the holding pressure Ph is applied through the shuttle valve 22 to the first pressure receiving portion 19 of the pressure compensating valve 18, the latter is held at its disconnecting position so that the flow of fluid discharged by the hydraulic pump 10 is blocked off thereby.

Backward flow of the pressurized fluid within the hydraulic actuator 16 through the second passage 48 within the above-mentioned operating valve 15 is prevented by the check valve 46.

Further, even in case where the fluid pressure in the load pressure introduction conduit 23 is directly supplied to the first pressure receiving portion 19 of the pressure compensating valve 18 without provision of the shuttle valve 22, if the discharge pressure Pl of the hydraulic pump 10 is lower than the holding pressure Ph, then the fluid discharged by the pump does not flow through the second passage 48 into the bypass conduit 43 so that the pressure in the third passage 49 becomes equal to that in the first actuator port 38, and hence the pressure in the first pressure receiving portion 19 of the pressure compensating valve 18 becomes equal to that in the second pressure receiving portion 21, with the result that the pressure compensating valve 18 is held by the resilient force of the spring at its disconnecting position.

That is to say, the shuttle valve 22 serves to supply the holding pressure in the hydraulic actuator 16 into the first pressure receiving portion 19 of the pressure compensating valve 18 to keep the pressure in the first pressure receiving portion 19 equal to the holding pressure Ph when the operating valve 18 is held at its neutral position N.

Since such an arrangement ensures that the pressure compensating valves 18, not in use, can be held by the holding pressure at their disconnecting position even in case a plurality of operating valves 15 are provided, when the pressure in the load pressure introduction conduit 23 is increased by operating one of the operating valves 15, since no volumetric change in the pressure compensating valves 18 including their associated conduits due to change in their stroke occurs, the pressure in the load pressure introduction conduit 23 can be increased quickly, thereby improving the response of the hydraulic circuit system.

Since, as a result, the discharge pressure $P_1$ of the hydraulic pump 10 is increased by the action of the aforementioned control valve 14, and the load pressure $P_{LS}$ is also increased correspondingly, the control valve 14 is urged by the load pressure $P_{LS}$ to its drainage position A where the pressure chamber 12*a* of the large diameter piston 12 is communicated with the fluid tank for drainage so as to swing the swash plate 13 by the small diameter piston 12 in such a direction as to increase the displacement of the pump 10 to increase the discharge pressure $P_1$ further. By conducting this operation respeatedly, the discharge pressure $P_1$ of the hydraulic pump 10 is increased successively.

③ When the discharge pressure $P_1$ of the hydraulic pump 10 is increased in such an extent that the pressure of pressurized fluid flowing through the first passage 15*b* which connects the first pumping port 33 of the operating valve 15 with the first actuator port 40 is increased to the same level as the holding pressure $P_1$ in the hydraulic actuator 16, the fluid under pressure will flow through the load check valve 46 provided in the second passage 48 and via the bypass conduit 43 into the hydraulic actuator 16.

As a result, the third passage 49 connected between the first restrictor 45 and the second restrictor 47 is supplied with a pressure whose intensity is between the outlet pressure of the operating valve 15, that is, the inlet pressure of the pressure compensating valve 18 (i.e., the pump discharge pressure) and the pressure in the bypass conduit 43, that is, the outlet pressure of the pressure compensating valve 18. The above-mentioned pressure is supplied as the load pressure $P_{LS}$ through the load pressure introduction conduit 23 into the first pressure receiving portion 19 of the pressure compensating valve 18.

Consequently, the pressure in the first pressure receiving portion 19 of the pressure compensating valve 18 becomes less than that in the second pressure receiving portion 21 causing a pressure difference. When the pressure differential exceeds the resilient force of the spring 20, the pressure conpensating valve 18 is switched from its disconnecting position over to its connecting position so that the pressurized fluid discharged by the hydraulic pump 10 will pass through the first pumping port 33, the first passage 15*b* and the first actuator port 38 of the operating valve 15 in turn and push the load check valve 25 open, thereby allowing the fluid to be supplied into one of the pressure chambers (the upper pressure chamber in the drawing) of the hydraulic actuator 16. The fluid returning from the other pressure chamber of the hydraulic actuator 16 will flow through the bypass conduit 43, the second auxiliary port 41, the fourth passage 50 and the second tank port 36 in turn and into the drainage conduit 28.

(Flow rate of pressurized fluid supplied into actuator 16)

The pressure differential $\Delta P_{LS}$ between the discharge pressure $P_1$ of the hydraulic actuator 10 and the load pressure $P_{LS}$ depends upon the pressure loss due to the resistance of conduits connecting the delivery side of the hydraulic pump 10 with the pumping port of the operating valve 15, the pressure loss in the first passage 15*b* of the operating valve 15, and the pressure loss due to the first restrictor 45 of the passage 48.

Hereupon, the pressure loss due to the resistance of conduits and the pressure losses in the other conduits are small, and so they are neglected. The discharge pressure is denoted by $P_1$, the pressure in the outlet of the first passage 15*b* of the operating valve 15 by $P_2$, the pressure in the outlet of the first restrictor 45 of the passage 48 by $P_3$, and the pressure in the outlet of the load check valve 25 by $P_4$. Further, the pressure $P_3$ in the outlet of the first restrictor 45 of the above-mentioned passage 48 becomes the load pressure $P_{LS}$.

The area of opening of the first passage 15*b* of the operating valve 15, i.e., the total area of openings of the first pumping port 33 and the first actuator port 38 is denoted by A.

If the above-mentioned pressure differential $\Delta P_{LS}$ is less than the resilient force of the spring 29 in this condition, then the control valve 14 is held at its drainage position as aforementioned so that the angle of the swash plate 11 is increased, thereby increasing the amount of fluid under pressure discharged by the hydraulic pump 10.

As a result, the flow rate of pressurized flow passing through the first passage 15*b* of the operating valve 15 will increase, thus increasing the pressure differential. When the pressure differential $\Delta P_{LS}$ becomes higher than the resilient force of the spring 29, the control valve 14 is switched over to its connecting position, thereby reducing the flow rate of pressurized fluid discharged by the hydraulic pump 10 as mentioned hereinabove.

That is to say, the control valve 14 is kept in equilibrium such that the pressure differential $\Delta P_{LS}$ multiplied by the area of the pressure receiving portion 14*a* becomes equal to the resilient force of the spring 29, and the amount of fluid under pressure discharged by the hydraulic pump 10 is controlled such that the value of the pressure differential $\Delta P_{LS}$ corresponds to the resilient force of the spring 29.

The flow rate Q of pressurized fluid supplied into the hydraulic actuator 16 is expressed by the following equation.

$$Q = CA\sqrt{\Delta P_{LS}} = CA\sqrt{P_1 - P_{LS}} = CA\sqrt{(P_1 - P_2) + (P_2 - P_3)}$$

wherein C is a constant, and A is the area of opening of the first passage 15*b* of the operating valve 15.

Thus, since the flow rate Q is pressurized fluid supplied into the hydraulic actuator is not given by equation $Q=CA\sqrt{P_1-P_2}$, but expressed by the equation $Q=CA\sqrt{(P_1-P_2)+(P_2-P_3)}$, the flow rate Q is not completely proportional to the area of opening of the first passage 15*b* of the operating valve 15 and includes the term $(P_2-P_3)$ as an error. When the fluid under pressure is supplied into the upper pressure chamber (in the drawings) of one of hydraulic actuators 16, a required flow rate of pressurized fluid can be secured by increasing the area of opening of the first passage 15*b* of the operating valve 15 by an amount equivalent to the above-mentioned error.

As one example, the numerical values of the pressures are given below.

In case the holding pressure Ph of the hydraulic actuator 16 is 150 kg/cm$^2$, and the setting load of the spring 29 of the control valve 14, that is, the pressure differential $\Delta P_{LS}$ is 20 kg/cm$^2$, $$P_1 = 173 \text{ kg/cm}^2,\ P_2 = 156 \text{ kg/cm}^2,$$

$$P_3 = 153 \text{ kg/cm}^2,\ P_4 = 150 \text{ kg/cm}^2 \text{ (holding pressure)}$$

(When the pressurized fluid is supplied into a plurality of hydraulic actuators)

Figure 2:
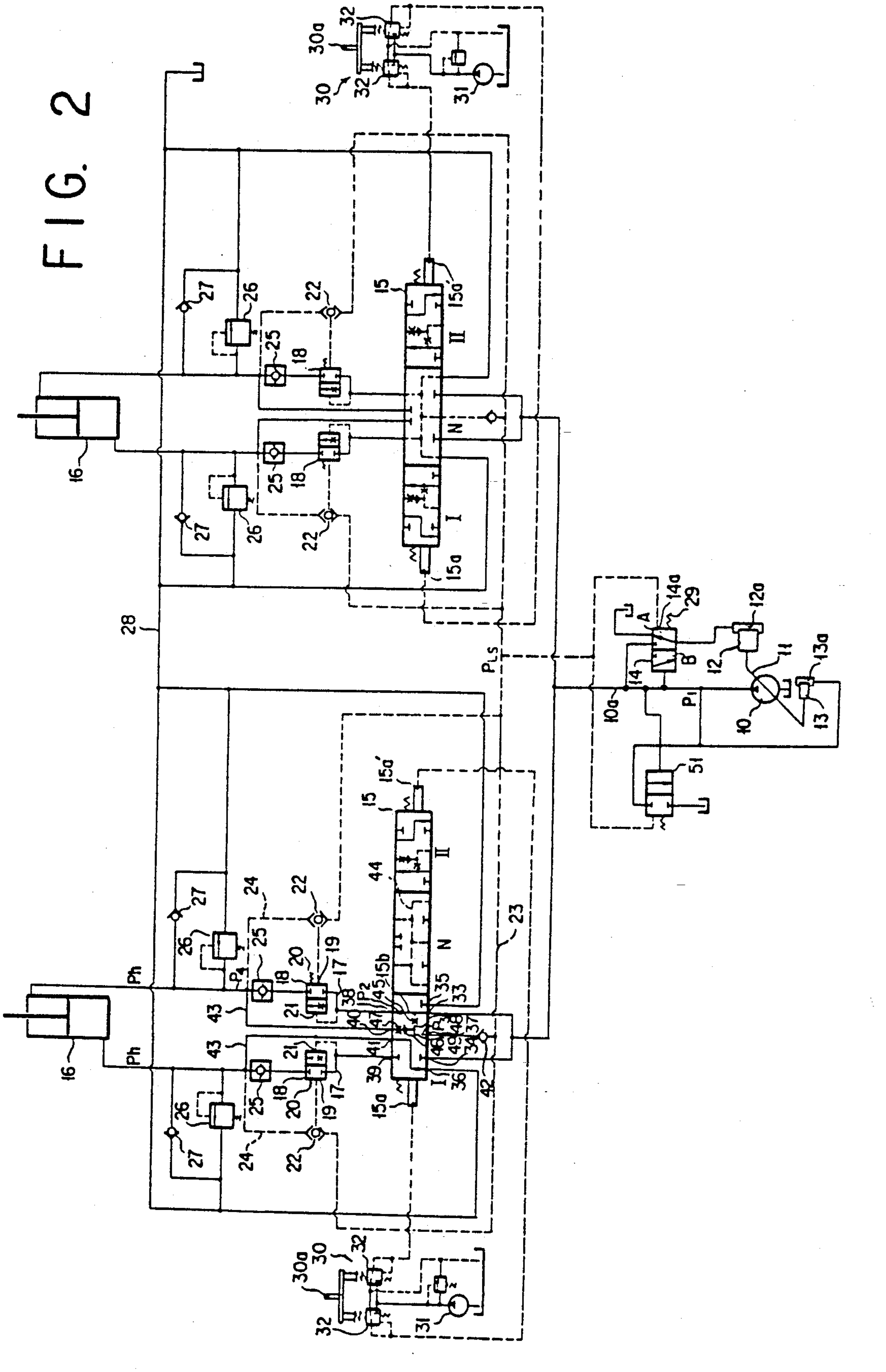
FIGS. 2 and 3 are explanatory views showing the operation of the first embodiment.
Figure 3:
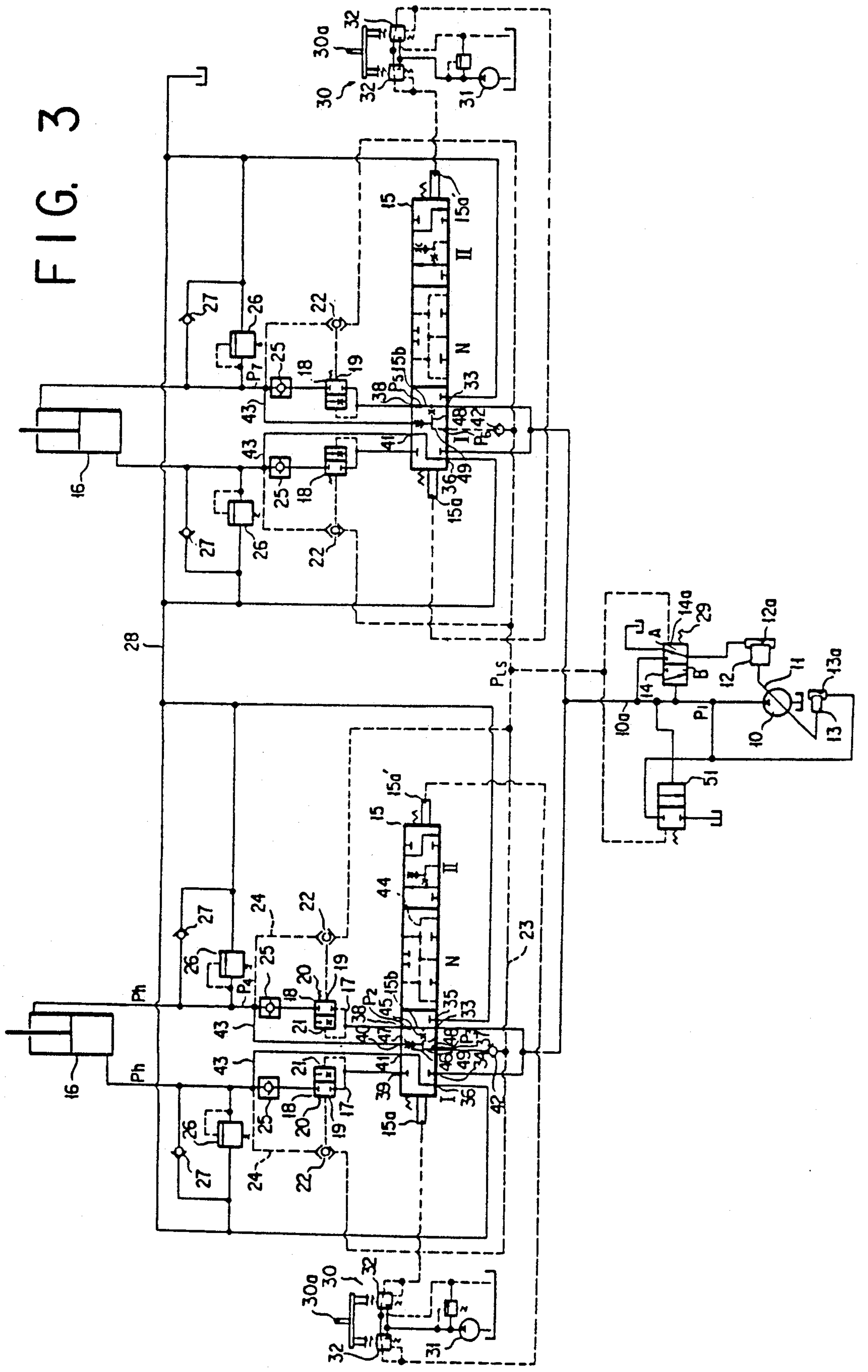

The operation for switching from the condition as shown in FIG. 2 wherein the pressurized fluid is supplied into the left hand hydraulic chamber 16 over to supply of the pressurized fluid into the right side hydraulic actuator 16 as shown in FIG. 3 will be described. Further, the holding pressure of the right hand hydraulic actuator 16 is assumed to be 200 kg/cm$^2$.

When the right hand operating valve 15 is switched over to its first pressurized fluid supply position I in the same manner as aforementioned, the pressurized fluid discharged by the hydraulic pump 10 will flow through the first pumping port 33, the first passage 15*b* and the first actuator port 38 in turn and into the inlet of the pressure compensating valve 18. Since the discharge pressure $P_1$ is then 173 kg/cm$^2$, the right hand pressure compensating valve 18 is held by the holding pressure applied to the first pressure receiving portion 19 at its disconnecting position where the fluid discharged by the hydraulic pump 10 is blocked off.

As a result, the discharge pressure $P_1$ of the hydraulic pump 10 is supplied through the passages 48 and 49 of the right hand operating valve 15 and the check valve 42 into the load pressure introduction conduit 23, and the discharge pressure $P_1$ is applied as the load pressure $P_{LS}$ to the pressure receiving portion 14*a* of the control valve 14 to thereby switch the latter over to its drainage position A. Consequently, the aforementioned pressure increasing process is recommenced and the discharge pressure $P_1$ of the hydraulic pump 10 is increased to the level of the holding pressure of 200 kg/cm$^2$ of the right hand hydraulic actuator 16. When the discharge pressure $P_1$ becomes higher than 200 kg/cm$^2$, the upper pressure chamber (in the drawing) of the right hand hydraulic actuator 16 is supplied with the discharge pressure of the hydraulic pump 10 in the same manner as in the above-mentioned operation of the single operating valve 15.

The numerical values of the pressures when the right hand hydraulic actuator 16 is in operation are as follows:

The discharge pressure $P_1$ of the hydraulic pump 10 will become 223 kg/cm$^2$, the pressure P5 in the outlet of the first passage 15*b* of the operating valve 15 will become 206 kg/cm$^2$, the pressure $P_6$ (load pressure $P_{LS}$) in the outlet of the first restrictor 45 of the passage 48 will become 203 kg/cm$^2$, and the pressure $P_7$ in the outlet of the load check valve 25 will become 200 kg/cm$^2$.

At that time, the left hand hydraulic actuator 16 is actuated as follows:

Since a load pressure of 153 kg/cm$^2$ was applied to the first pressure receiving portion 19 of the left hand pressure compensating valve 18, when the right hand hydraulic actuator 16 is rendered operative, the load pressure $P_{LS}$ (=203 kg/cm$^2$) thereof is applied through the check valve 42, the load pressure introduction conduit 23 and the shuttle valve 22 to the first pressure receiving portion 19. When the load pressure $P_{LS}$ applied to the first pressure receiving portion 19 becomes more than the pressure ($P_2$=156 kg/cm$^2$) in the second pressure receiving portion 21, the pressure compensating valve 18 is urged to its disconnecting position where the opening thereof is reduced with the result that the pressure in the inlet of the pressure compensating valve 18, that is, the pressure $P_2$ in the outlet of the first passage 15*b* of the operating valve 15 will increase and be kept in equilibrium when it has become equal to the load pressure of 200 kg/cm$^2$ in the right hand hydraulic actuator 16.

That is, the pressure in the first pressure receiving portion 19 of the left pressure compensating valve 18 of the left hydraulic actuator 16 will increase to the load pressure $P_{LS}$=203 kg/cm$^2$ corresponding to the holding pressure of the right hand hydraulic actuator 16. With that pressurizing, the inlet pressure of the pressure compensating valve 18 will also increase and be kept in equilibrium at a load pressure $P_{LS}$ of 203 kg/cm$^2$.

As a result, the outlet pressure $P_2$ of the first passage 15*b* of the left hand operating valve 15 will become 203 kg/cm$^2$, the outlet pressure $P_4$ of the load check valve 25 will become 150 kg/cm$^2$, and the outlet pressure $P_3$ of the first restrictor 45 of the passage 48 will become 176.5 kg/cm$^2$.

The outlet pressure $P_3$ of the first restrictor 45 serves as the load pressure, but is lower than the load pressure=203 kg/cm$^2$ in the right hand hydraulic actuator 16, and therefore supply of the pressure $P_3$ to the first pressure receiving portion 19 of the pressure compensating valve 18 is prevented by the action of the check valve 42.

Namely, the load pressure $P_{LS}$ corresponding to the holding pressure of each hydraulic actuator 16 is introduced into the load pressure detection port 37 of each operating valve 15. However, since a highest load pressure is introduced into the load pressure introduction conduit 23 by the action of the check valve 42, the first pressure receiving portion 19 of each pressure compensating valve 18 is supplied with the highest load pressure so that each pressure compensating valve 18 is set at a pressure equal to the highest load pressure. Therefore, each of the hydraulic actuators 16 whose holding pressures are different is supplied with pressurized fluid discharged by the hydraulic pump 10 at a flow rate in proportion to the degree of opening of the operating valve 15 associated therewith.

The flow rates of pressurized fluid supplied into the left and right hydraulic actuators 16 when they are operated at the same time will become as follows:

If the flow rate of fluid under pressure discharged by the hydraulic pump 10 is denoted by Q, that of the fluid supplied into the low pressure (left hand) hydraulic actuator 16 by $Q_1$, and that of the fluid supplied into the high pressure (right-hand) hydraulic actuator by $Q_2$, the following relationship is established between them.

$$Q = Q_1 + Q_2$$

$$Q_1 = CA_1 \times \sqrt{P_1 - P_2}$$

-continued $$Q_2 = CA_2 \times \sqrt{P_1 - P_5}$$

If $P_1=223$ kg/cm$^2$, $P_2=203$ kg/cm$^2$ and $P_5=206$ kg/cm$^2$ are substituted in the above equations, the values of $Q_1$ and $Q_2$ become as follows:

$$Q_1 = CA_1 \times \sqrt{20}$$

$$Q_2 = CA_2 \times \sqrt{17}$$

Since even if the areas $A_1$, $A_2$ of openings of the first passages 15*b* of the left and right hydraulic actuators 16 are equal, the above-mentioned values of the pressures remains unchanged, the ratio of flow rates of pressurized fluid supplied into the left and right hydraulic actuators $Q_2/Q_1$ will become as follows:

$$\frac{Q_2}{Q_1} = \frac{CA_1 \times \sqrt{17}}{CA_2 \times \sqrt{20}} = \sqrt{\frac{17}{20}} = 0.92$$

Thus, the flow rate distribution error will become 8%.

In contrast therewith, when the load pressure $P_{LS}$ is introduced into the outlet of the pressure compensating valve 18 in the same manner as in the prior art, the pressure loss of the pressure compensating valve 18 in the high pressure (right hand) hydraulic actuator 16 will become $P_5-P_7=206$ kg/cm$^2-200$ kg/cm$^2=6$ kg/cm$^2$, and therefore the flow rate $Q_2$ of the fluid supplied into the right hand hydraulic actuator will become as follows:

$$Q_2 = CA_2\sqrt{20-6} = CA_2 \times \sqrt{14}$$

Thus, the above-mentioned ratio of flow rate is $$\frac{Q_2}{Q_1} = \sqrt{\frac{14}{20}} = 0.83$$

Therefore, the flow rate distribution error will become as high as 17%. Further, the sequence of the second restrictor 47 and the check valve 46 provided in the passage 48 of the operating valve 15 may be reverse to that shown in FIG. 1.

Next, modified embodiments will be described with reference to FIGS. 4, 5 and 6. The component parts of the modifications having similar functions as those of the component parts of the above-mentioned first embodiment are denoted by the identical or like reference numerals, and the description of them is omitted herein to avoid duplication of explanation.

Figure 4:
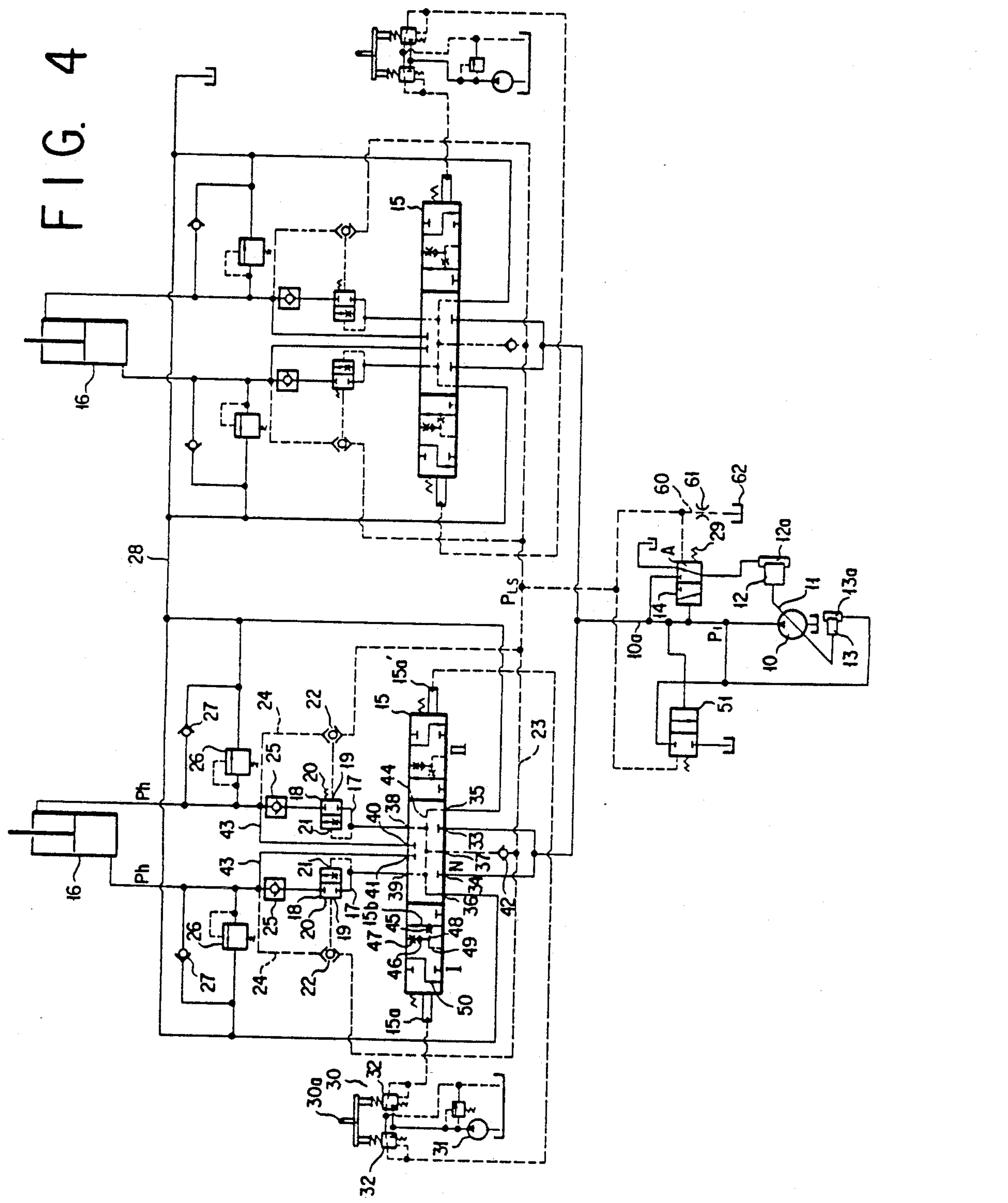
FIGS. 4, 5 and 6 are schematic hydraulic circuit diagrams showing modified embodiments, respectively, of the present invention.

As shown in FIG. 4, the load pressure introduction conduit 23 is provided with a bypass conduit 60, which is connected through a restrictor 61 to a fluid tank 62.

In such an arrangement, when each operating valve 15 is held at its neutral position, the pressure in the load pressure introduction conduit 23 can be lowered quickly, and hence the load pressure applied to the control valve 14 can be reduced to zero quickly, thereby lowering the discharge pressure $P_1$ of the hydraulic pump 10 rapidly. Therefore, the drive load on the hydraulic pump 10 can be reduced immediately, and hence the level of the noise due to the load on the hydraulic pump 10 can be reduced.

Figure 5:
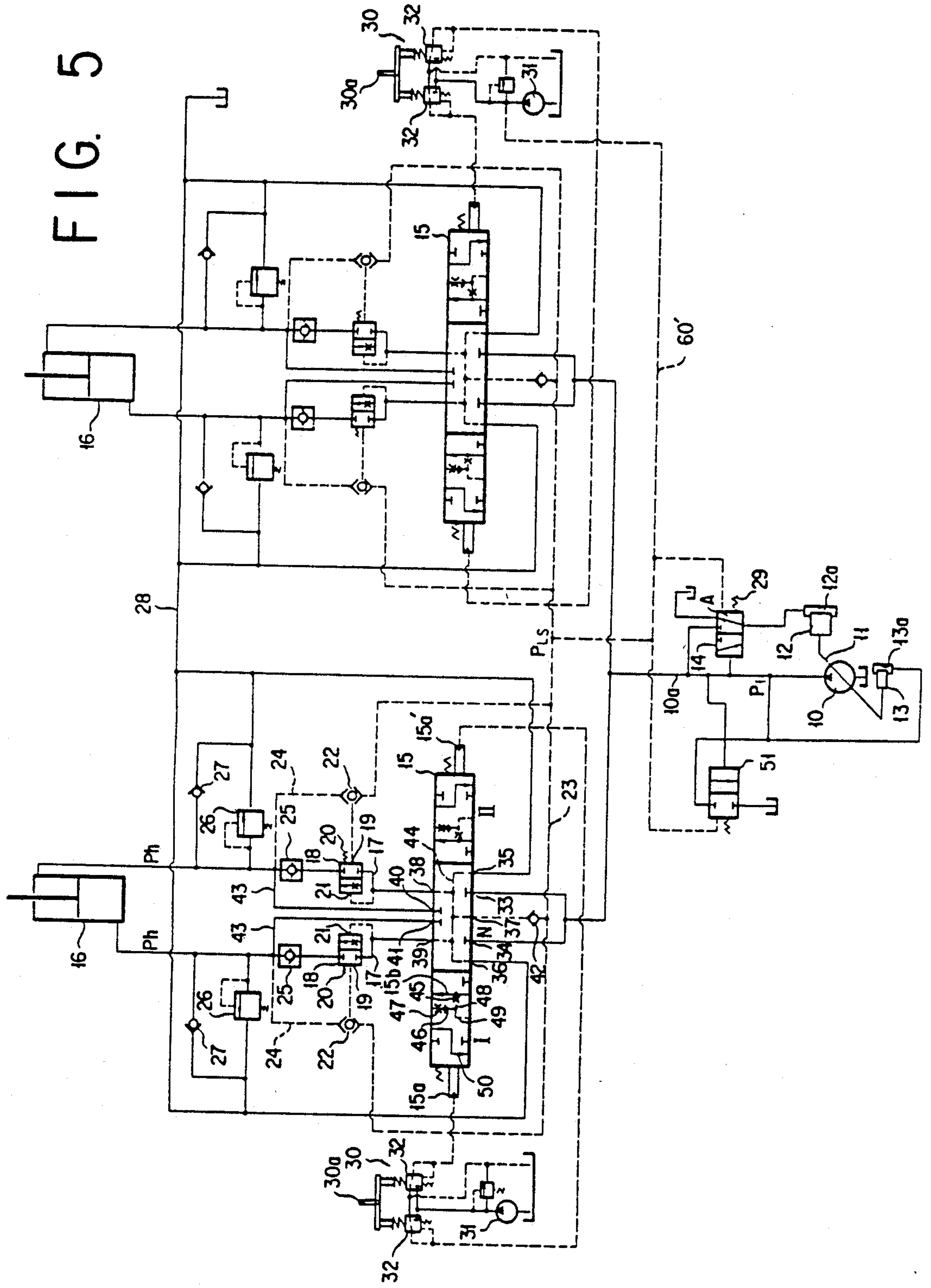

As shown in FIG. 5, a bypass conduit 60' is connected between the discharge conduit of the pilot pressure supply hydraulic pump 31 of the pilot control valve 30 and the load pressure introduction conduit 23.

The hydraulic ciruict system thus modified fulfills the same function as the aforementioned embodiments.

Figure 6:
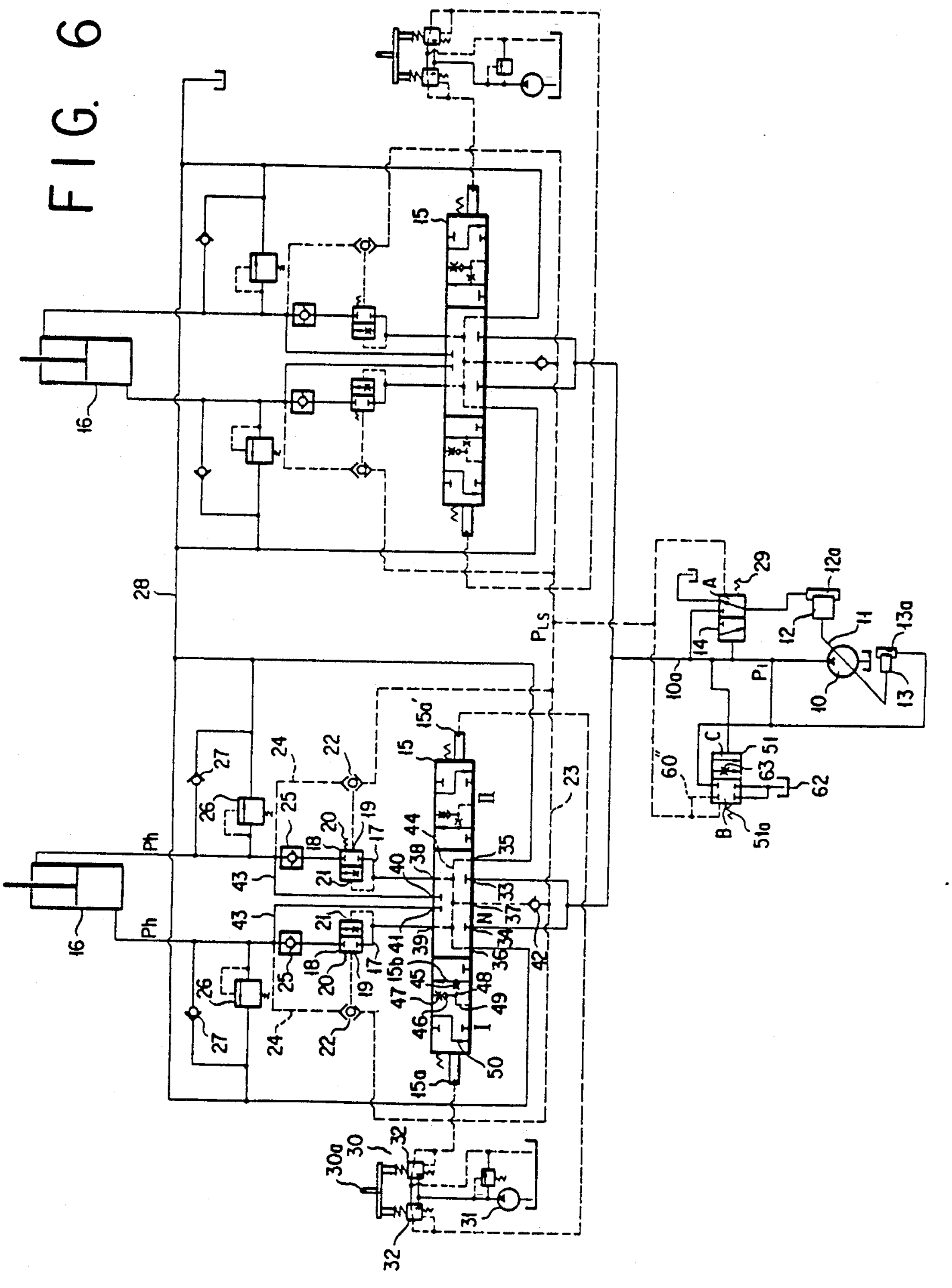
Figure 7:
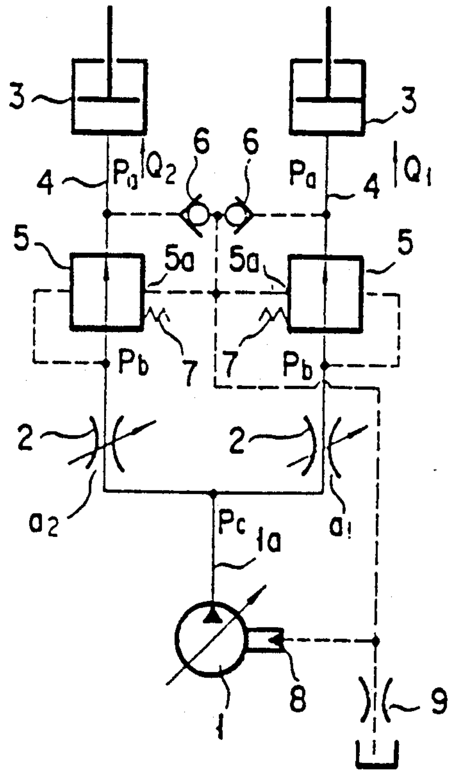
FIG. 7 is a schematic hydraulic circuit diagram showing a prior art example.

As shown in FIG. 6, the above-mentioned load pressure introduction conduit 23 is arranged to be connected with or disconnected from the fluid tank 62 through a bypass conduit 60" connected with an unloading valve 51. When the unloading valve 51 is switched from its disconnecting position B over to its connecting position C, the bypass conduit 60" is allowed to communicate through a restrictor 63 with the fluid tank 62.

In such a hydraulic circuit arrangement, when the operating valve 15 is switched from its neutral position N over to its first or second pressurized fluid supply position I or II, the pressure differential between the discharge pressure $P_1$ of the hydraulic pump 10 and the load pressure $P_{LS}$ becomes less than the resilient force of a spring 51*a* of an unloading valve 51, and as a result, the unloading valve 51 is switches from its connecting position C over to its disconnecting position B. Consequently, the load pressure introduction conduit 23 is not allowed to communicate through the bypass load 60" with the fluid tank 62 so that the response of the hydraulic circuit system can be secured. Whilst, when the operating valve 15 is switched from its first or second pressurized fluid supply position I or II to its neutral position N, the unloading valve 51 is switched from its disconnecting position B over to its connecting position C to allow the load pressure introduction conduit 23 to communicate through a restrictor 63 with the fluid tank 62. Consequently, the load pressure is lowered quickly, and hence the pump discharge pressure is also lowered quickly so that the operator will not have a sense of incompatibility.

What is claimed is:

1. A hydraulic circuit system including:

a plurality of operating valves provided in a discharge conduit of a hydraulic pump; and a plurality of pressure compensating valves provided in a plurality of connection circuits connected between these operating valves and a plurality of hydraulic actuators, wherein these pressure compensating valves are set at a highest value of the load pressures applied to the hydraulic actuators, respectively, characterized in that each pressure compensating valve is held so as to be biased by the resilient force of a spring in such a direction as to disconnect it, and that each of the pressure compensating valves has a second pressure receiving portion adapted to urge it by the fluid pressure applied thereto in such a direction as to connect it, and a first pressure receiving portion adapted to urge it by the fluid pressure applied thereto in combination with the resilient force of the spring in such a direction as to disconnect it, the second pressure receiving portion being connected with the pressurized fluid outlet side of each operating valve, and the first pressure receiving portion being connected with a load pressure introduction conduit which is connected through a check valve with a load pressure detection port of each operating valve, and that on the pressurized fluid outlet side of each pressure compensating valve each of said connection circuits is connected through a bypass conduit to an outlet port of the operating valve associated therewith, and that when each of said operating valves is located at its neutral position to the load pressure detection port is connected with the fluid tank whereas pumping ports, actuator ports and outlet ports of the operating valve are disconnected, whilst, when each of said operating valves is located at its position for supplying pressurized fluid into the hydraulic actuator associated therewith one of the pumping ports of the operating valve is connected through a first passage with one of the actuator ports, and one of the outlet ports connected with said bypass conduits is connected with the first passage through a second passage having a first restrictor, a load check valve and a second restrictor, and the second passage is connected through a third passage formed between the first and second restrictors with the load pressure detection port.

2. A hydraulic circuit system including:

a plurality of operating valves provided in a plurality of pressurized fluid supply conduits connected between a variable displacement type hydraulic pump and a plurality of hydraulic actuators each having two mutually opposed pressure chambers so as to be driven by the pressurized fluid discharged by the pump, the number of the operating valves being identical to that of the actuators; and a plurality of pairs of pressure compensating valves, each pair of pressure compensating valves being provided in a pair of connection circuits connected between each of the operating valves and two pressure chambers of each actuator, wherein these pressure compensating valves are set at a highest value of the load pressures applied to said hydraulic actuators, respectively, characterized in that each pressure compensating valve is held to be biased by the resilient force of a spring in such a direction as to disconnect it, each of said pressure compensating valves having a second pressure receiving portion adapted to urge it by the fluid pressure applied thereto in such a direction as to connect it, and a first pressure receiving portion adapted to urge it by the fluid pressure applied thereto in combination with the resilient force of the spring in such a direction as to disconnect it, the second pressure receiving portion being connected with one of actuator ports on the pressurized fluid outlet side of said operating valve, the first pressure receiving portion being connected with a load pressure introduction conduit which is connected through a check valve with a load pressure detection port formed on the pressurized fluid inlet side of each operating valve, and that on the pressurized fluid outlet side of each pressure compensating valve each of said connection circuits is connected through a bypass conduit to outlet ports of each operating valve, and that when each of the operating valves is located at its neutral position said load pressure detection port is connected with the fluid tank, whereas pumping ports, actuator ports and outlet ports of the operating valve are disconnected, whilst when each of said operating valves is located at its position for supplying pressurized fluid into either one of the pressure chambers of the hydraulic actuator associated therewith one of the pumping ports of the operating valve is connected through a first passage formed within the operating valve with one of the actuator ports which is connected through one of the connection circuits with one of the pressure chambers, and one of the outlet ports is connected with the first passage through a second passage formed within the operating valve and having a first restrictor, a load check valve and a second restrictor, and the second passage is connected through a third passage formed between the first and second restrictors in the operating valve with said load pressure detection port, and further the other actuator port connected through the other connection circuit with the other pressure chamber is connected through a fourth passage formed within the operating valve with one of tank ports connected with a drainage conduit.

3. A hydraulic circuit system as claimed in claim 1 or 2, characterized in that each of said operating valves has pilot fluid pressure receiving portions on both sides thereof, the arrangement being made such that either one of the pilot pressure receiving portions is supplied with the pilot fluid under pressure from a hydraulic pump for supplying pilot fluid under pressure through a pilot control valve whose area of opening is increased proportional to the operational stroke of a lever.

4. A hydraulic circuit system as claimed in claim 3, characterized in that said load pressure introduction conduit has a bypass passage connected on one side thereof with the load pressure introduction conduit and on the other side thereof with a discharge conduit of said hydraulic pump for supplying pilot fluid under pressure.

5. A hydraulic circuit system as claimed in claim 3, characterized in that said load pressure introduction conduit includes a bypass passage connected on one side thereof with the load pressure introduction conduit and on the other side thereof through a restrictor with the fluid tank.

6. A hydraulic circuit system as claimed in claim 3, characterized in that said load pressure introduction conduit has a restrictor and is connected with the fluid tank through a bypass passage connected with an unloading valve.

7. A hydraulic circuit system as claimed in any one of claims 1 or 2, characterized in that said load pressure introduction conduit includes a bypass passage connected on one side thereof with the load pressure introduction conduit and on the other side thereof through a restrictor with the fluid tank.

8. A hydraulic circuit system as claimed in any one of claims 2 or 2, characterized in that said load pressure introduction conduit has a restrictor and is connected with the fluid tank through a bypass passage connected with an unloading valve.

* * * * *